United States Patent [19]

Lyle, Jr. et al.

[11] Patent Number: 4,677,596

[45] Date of Patent: Jun. 30, 1987

[54] METHOD OF DETECTING AND CORRECTING IMPULSE NOISE ERRORS IN LOG DATA

[75] Inventors: W. D. Lyle, Jr.; Donald M. Williams, both of Grapevine, Tex.

[73] Assignee: Mobil Oil Corporation, New York, N.Y.

[21] Appl. No.: 594,190

[22] Filed: Mar. 28, 1984

[51] Int. Cl.⁴ .......................... G01V 1/40; G01V 1/36
[52] U.S. Cl. ....................................... 367/46; 364/422
[58] Field of Search ...................... 367/43, 41, 46, 40, 367/42; 364/421, 422, 724

[56] References Cited

U.S. PATENT DOCUMENTS 4,535,625  8/1985  Lyle, Jr. ................................ 364/422

OTHER PUBLICATIONS

Thomas Kailath, Lectures on Linear Least—Squares Estimation.
Foster, et al., Optimum Inverse Filters which Shorten the Spacing of Velocity Logs, Geophysics, vol. XXVII, No. 3 (Jun., 1962), pp. 317–326.
Bayless, et al., Application of the Kalman Filter to Continuous Signal Restoration, Geophysics, vol. 35, No. 1, (Feb. 1970), pp. 2–23.
Julius S. Bendat, Allan G. Piersol, Random Data: Analysis and Measurement Procedures.

*Primary Examiner*—Nelson Moskowitz
*Assistant Examiner*—Ian J. Lobo
*Attorney, Agent, or Firm*—Alexander J. McKillop; Michael G. Gilman; Charles J. Speciale

[57] ABSTRACT

Disclosed is a logging technique wherein measured parameters which are inherently weighted average measurement values are inverse filtered to improve the resolution of the measured values. Higher resolution values of log measurements are obtained from information contained in the measurements themselves, and the response function of a logging tool. Measurement errors due to impulsive noise are detected, located and corrected using innovation data contained in the log measurements.

17 Claims, 13 Drawing Figures

SYNTHETIC SONIC PROFILE

SONIC LOG OF
SYNTHETIC PROFILE

SONIC LOG WITH IMPULSE
ERRORS AT POINT A,B,C,D

INVERSE OF SONIC LOG CONTAINING IMPULSE NOISE

SONIC LOG WITH IMPULSE ERRORS MACHINE DETECTED AND CORRECTED

INVERSE OF CORRECTED DATA

METHOD OF DETECTING AND CORRECTING IMPULSE NOISE ERRORS IN LOG DATA

BACKGROUND OF THE INVENTION

1. Field of the Invention

The present invention relates to a method of improving the quality of data obtained by well logging a borehole and, more particularly, to a method of detecting, locating and correcting impulse noise errors in log measurements using an inverse filtering technique which determines innovations in a measurement as part of the inverse filtering process. The innovations in a measurement is the new information contained therein not already contained in previous measurements.

2. Discussion of the Prior Art

Measurement of subsurface formation parameters by lowering a logging tool down a wellbore is routinely done to provide data for accurate evaluation of the formation. Among the parameters measured are electrical resistivity and conductivity, density, sonic travel time, natural radioactivity, and formation response to neutrons. At each point at which a measurement is made the distance along the wellbore from a reference datum to that point is recorded. A grouping, such as a display of the measured values as a function of depth, is known as the log of the measured formation parameter.

Numerous logging tools are used to obtain the various measurements, but there is a characteristic common to them all. That is, the tool does not in reality measure the desired parameter at a point in the formation adjacent to the point in the wellbore at which the measurement is made. What the tool actually measures is a weighted average of values of the parameter at points up and down the wellbore from the measurement point, as well as the value of the parameter at the measurement point.

One technique which has been used to sharpen the resolution of log values is inverse filtering, which processes the measured values to obtain better parameter estimates $\tilde{X}_j$ at each measurement point. One improved inverse filtering method using a recursive innovations technique is disclosed in co-pending U.S. patent application Ser. No. 577,093, filed Feb. 6, 1984, entitled "Method of Increasing the Vertical Resolution of Well Log Data", and assigned to the same assignee as the present invention. The entirety of the disclosure of this application is incorporated herein by reference.

Inverse filtering techniques can work well to improve log data resolution when there is little measurement noise present. However, such filters have not been found to work well with noisy data due to the fact that these filters amplify the noise and, in many cases, the amplified noise is the dominant component in the estimated value. Techniques that account for the measurement noise treat the inverse filtering problem as a problem in statistical estimation theory. Using this approach, the formation parameters to be estimated are treated as samples from a random process and characterized in terms of its first- and second-order statistical averages. Processing treatments are designed by minimizing some average function of the error between the estimated measurement value $\tilde{X}_j$ and the true measurement value $X_j$. In doing this, the processing treatment becomes an estimator or procedure for determining an estimate of a sample from a random process (true parameter values), given samples from another random process (the measurements) that contain noise. The estimate produced by such an estimator balances the errors due to noise amplification and those due to incomplete sharpening in such a way that the total error between estimate and true value in minimized.

Noise correction and data sharpening techniques designed using estimation theory provide reliable and accurate measurement estimates so long as the noise obeys the statistical averages that are assumed. Representative of these techniques are those using the Kalman filter (see Bayless, J. W. and Brigham, E. O., "Application of the Kalman Filter to Continuous Signal Restoration", Geophysics, Vol. 35, No. 1, February 1970, pages 2–23); recursive innovations, as described in the above-referenced patent application Ser. No. 577,093, and Weiner filtering (see Foster, M. R., Hicks, W. G. and Nipper, J. T., "Optimum Inverse Filters Which Shorten the Spacing of Velocity Logs", Geophysics, Vol. 27, No. 3, June 1962, pages 317–326). Unfortunately, noise with characteristics significantly different from those assumed is frequently encountered. This type of noise is referred to as impulsive or spike noise and, when present, causes large errors in the measurements. Usually, the impulse noise occurs at isolated measurement points or, at most, extends over a few measurement points. Noise of this type is extremely difficult to characterize statistically in a way that would allow for a practical inverse filter design. The occurrence of such noise is unpredictable, and when it occurs its magnitude is equally unpredictable.

Since the impulse noise cannot easily be characterized in a statistical manner, it is difficult to account for its possible presence in the design of an inverse filter, and consequently such noise is difficult to remove from measured parameter values when employing an inverse filtering technique to sharpen data resolution.

SUMMARY OF THE INVENTION

The present invention has, as one of its objectives, the attainment of an increase in the vertical resolution of measured parameter values in borehole logging to thereby obtain a more accurate measurement of the true formation parameter value than is recorded during a logging operation.

Another object of the invention is the provision of a method of improving the vertical resolution of measurement parameter values in log data which also detects, locates and removes the effects of impulsive noise.

These objectives are achieved by a processing technique which uses certain classes of inverse filters to detect the presence of impulse noise, locate the point at which it occurs, and correct the parameter measurement at that point to remove the noise. The detection, location and correction process is carried out by an inverse filtering technique which determines the innovations in a measurement as part of the inverse filtering process and which uses the innovations in a unique way to detect, locate and correct for the effects of impulsive noise.

The above and other objects, advantages and features of the invention will be more readily understood from the following detailed description of the invention, which is provided in connection with the accompanying drawings.

DETAILED DESCRIPTION OF THE INVENTION

Figure 1:
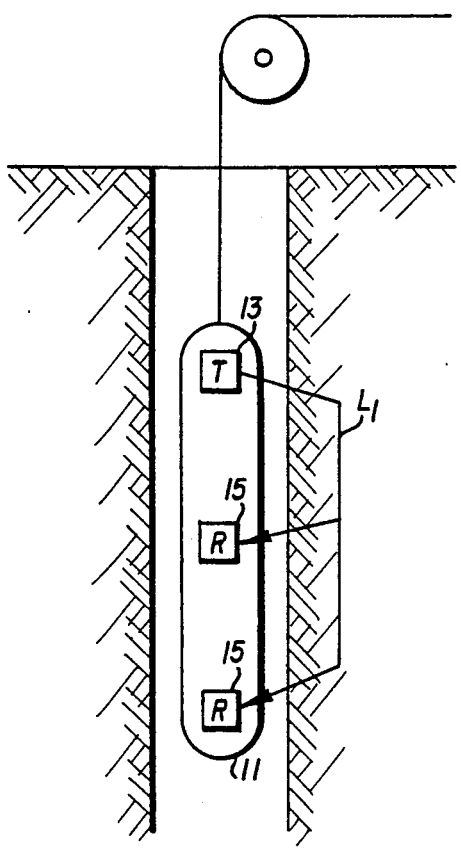
FIG. 1 illustrates an apparatus typically used for well bore logging.

FIG. 1 illustrates the apparatus typically employed in well logging. A logging tool 11 is lowered into a borehole and then retrieved. As the tool is moved along the borehole, e.g., pulled up, a series of measurements are taken at discrete regularly spaced points, as determined by measuring movement of the logging cable, by, for example, an acoustic transmitter 13 and one or more receivers 15. The measured values are recorded as a function of borehole depth, as measured by the cable motion, by a recorder which produces a log of the measured parameter. Because of the path length $L_1$ between the transmitter 13 and receivers 15, a measured parameter value at any point along the borehole is a measurement of an average weighted parameter value along the path $L_1$.

The filtering which inherently occurs to produce the weighted average logs can be expressed as follows:

$$Y_j = N_j + \sum_{k=-L}^{L} h_{j-k} X_{j-k} \tag{1}$$

where
$Y_j$ = log value recorded at point j
$N_j$ = measurement noise at point j
$X_l$ = value of formation parameter at point
$h_l$ = filter coefficient associated with the parameter value at point
$2L+1$ = filter length In Equation (1) the filter length is specified to be an odd number as a matter of convenience. If the number of h values is an even number, then it will be assumed that an additional h value of zero is included to ensure that the filter length is odd. The results are not changed when this is done, and doing so avoids the necessity of treating the even and odd number coefficients separately in the subsequently described discussion.

Equation (1) can be completely written in matrix notation as:

$$Y_j = H_j^T M_j + N_j \tag{2}$$

where the superscript T denotes matrix transponse, and $$H_j = \begin{bmatrix} h_{j+L} \\ \vdots \\ h_j \\ \vdots \\ h_{j-L} \end{bmatrix} \tag{3}$$

and $$M_j = \begin{bmatrix} X_{j+L} \\ \vdots \\ X_j \\ \vdots \\ X_{j-L} \end{bmatrix} \tag{4}$$

The $H_j$ of Equation (3) represents the tool response function at point j along the borehole and will be herein referred to as the tool response function vector; $M_j$ is a matrix of the true parameter measurement values centered about point j along the borehole; and $N_j$ is the measurement noise at point j.

The measurement noise $N_j$ represents the uncertainty in the recorded value due to extraneous signals and accuracy limitations of the tool itself. An illustration of this latter source of noise occurs in the sonic tool which typically records formation acoustic energy travel time to an accuracy of one to three microseconds/foot. This means that if a large number of measurements of formation travel time were made at the point j, then the resulting collecting of values would have a sample mean equal to $$Y_j = \Sigma h_{j-k} X_{j-k} \tag{5}$$

and a sample deviation equal to some number in the one to three microsecond range. Other tools measuring different parameters have similar accuracy limitations.

The invention employs the concept of inverse filtering the logged data to determine an estimate ($\hat{X}_j$) of the true parameter value $X_j$ at each point (j) of interest in some interval along the wellbore for which measurements $Y_j (Y_1, Y_2 \ldots Y_N)$ are available and in detecting, locating and removing impulse noise so that it effects on the estimated values ($\hat{X}_j$) are minimized.

The detection, location and correction process can be carried out by any inverse filter that calculates the innovations in a measurement as part of the inverse filtering process. This includes certain Kalman inverse filters, as well as the recursive innovations filter described in the above-referenced U.S. application Ser. No. 577,093. In these types of filters an estimation equation of the following form is used:

$$M_k(+) = M_k(-) + G_k[Y_k - H_k^T M_k(-)] \tag{6}$$

where $$M_k = \begin{bmatrix} X_{k+L1} \\ \vdots \\ X_k \\ \vdots \\ X_{k-L2} \end{bmatrix} \quad (7)$$

and $$H_k = \begin{bmatrix} 0 \\ \vdots \\ 0 \\ h_{k+L} \\ \vdots \\ h_k \\ \vdots \\ h_{k-L} \\ 0 \\ \vdots \\ 0 \end{bmatrix} \quad (8)$$

In Equation (6) $M_k(-)$ is an estimate of the $M_k$ of Equation (7) before measurement $Y_k$ is processed, and $M_k(+)$ is the estimate of $M_k$ after measurement $Y_k$ is processed. $G_k$ of Equation (6) is a filter gain term calculated according to formulas well known in the literature. The $L_1$ and $L_2$ terms in Equation (7) are assumed to satisfy $L_1, L_2 \geq L$ of Equation (1).

The $M_k(+)$ of Equation (2) is used to determine an estimate of one of the true parameter values. In the recursive innovations inverse filtering technique disclosed in the above-referenced application Ser. No. 557,093, for example, the estimate $\tilde{X}_{k-L}$ of $X_{k-L}$ is obtained from $M_k(+)$ by $$\tilde{X}_{k-L} = [0, \ldots, 0, 1] M_k(+) \quad (9)$$

where in that filter the $L_1$ and $L_2$ of Equation (6) are both made equal to L. There are other possibilities for obtaining the various X estimates, but how this is done in a particular inverse filter is not of any importance as far as the present invention is concerned. What is important is that the inverse filter has an equation of the form of Equation (6), in which the innovations of $Y_k$ are processed. The innovations in a measurement $Y_k$ is the new information contained in the measurement not already contained in previous measurements. This concept is explained in detail in Kailath, T., "Lectures on Linear Least-Squares Estimation", *CISM Courses and Lectures*, No 140, Springer-Verlag, New York, 1976. In Equation (6), the innovations, denoted hereafter by $i_k$, is $$i_k = Y_k - H_k^T M_k(-) \quad (10)$$

Error detection is accomplished by utilizing a quantity $U_k$ defined by $$U_k = Y_k - H_k^T M_k(+) \quad (11)$$

which is easily seen to be related to $i_k$ by $$U_k = i_k - H_k^T G_k i_k \quad (12)$$

$U_k$ as defined above represents the change in the innovations occuring as the result of $Y_k$ being processed. With a filter designed to account for noise of the type that is not impulsive, it can be seen that $U_k$ is smaller than $i_k$ if no impulse noise is present. However, if impulse noise is present, it has been determined experimentally that $U_k$ is large relative to what its value would be if no impulse noise were present. In fact, the $U_k$ value begins to increase in magnitude at some point prior to the point at which the impulse noise occurs, and the $U_k$ value remains large for several points beyond the noise point. This behavior of $U_k$ leads to a procedure for locating points at which impulse noise is present. In this procedure, the measured data $Y_j(Y_1, Y_2 \ldots Y_N)$ can be processed beginning at the uppermost point and proceeding down (top-down) or beginning at the lowermost point and proceeding up (bottom-up).

If $U_k$ of Equation (11) is the change in innovations by top-down processing and if another value $D_k$, of the same form as Equation (11), represents the change in innovations by bottom-up processing, then, a new term $e_k$ can be calculated at each point according to $$e_k = |U_k|^\nu \cdot |D_k|^\nu \quad (13)$$

where $\nu$ is some arbitrary positive number greater than or equal to one, e.g., 2.

Figure 2:
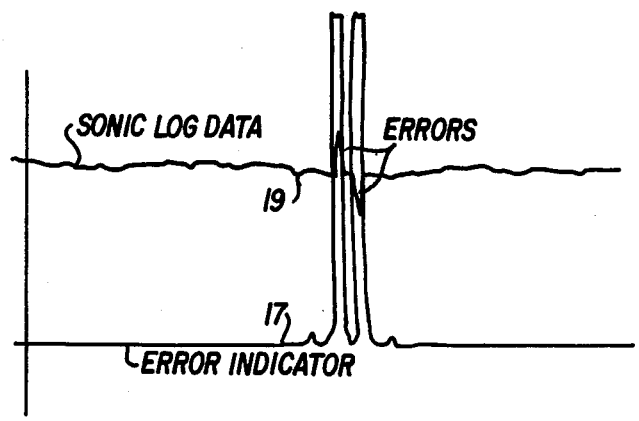
FIG. 2 is a graph illustrating the error detection employed in the invention.

Whenever there is no impulse noise present in the data, the value of $e_k$ is small. Whenever impulse noise is present, the value of $e_k$ becomes large at the point at which such noise is present. Numeral 19 in FIG. 2 illustrates a sonic log with a pair of noise spikes present, and numeral 17 illustrates the resulting $e_k$ value. As shown, $e_k$ assumes its maximum value at the points in error.

Errors are computer detected by iteratively searching the $e_k$ values for the largest values and iteratively correcting the $Y_k$ at those points in accordance with the correction equation:

$$Y_k' = Y_k + a[U_k - Y_k] + b[D_k Y_k] \quad (14)$$

where $Y_k'$ is the corrected measurement value and a and b are positive constants chosen according to the particular logging tool and inverse filtering technique used and in accordance with the nature of the errors to be corrected, as described below.

The $U_k$ and $D_k$ functions are affected for several points on either side of the actual error. This effect is very small before the error is processed (i.e., above the error point for $U_k$ and below the error point for $D_k$), but is very pronounced after the error is processed. Because of this, it is necessary to adaptively alter the a and b coefficients in Equation (14). If the impulsive error detected is isolated, i.e., it has no other impulsive errors within a spacing defined as 3 filter lengths either above or below it, then $a = \frac{1}{2}$ and $b = \frac{1}{2}$ are the best choice. If there is another error within 3 filter lengths above the current error, then only the $D_k$ term should be used for correction in Equation (14) ($a = 0, b = 1$) because $U_K$ will be affected by the other error. If there is an error below the current error within 3 filter lengths, then $a = 1, b = 0$ are appropriate, since $D_k$ will be affected by the other error. If there are errors above and below within 3 filter lengths, then the current error should not be corrected in this iteration since there is no good estimate of its correct value.

Since there cannot be an error above the first error detected at the top of the log or one below the last error detected, this process will eventually correct all the errors. In practice, it will typically correct all the errors in a 6,000 point log in 30 to 50 iterations.

Once the measurement data $Y_k$ is corrected using Equation (14), the log data is refiltered and new $e_k$, $U_k$, and $D_k$ values are calculated at each point. Error detection and correction proceeds iteratively in the above manner until the changes in $Y_k$, using Equation (14) (and the appropriate a and b values) at identified error points, becomes less than the measuring accuracy of the tool.

Whenever this iterative process is completed, the final inverse filtered data is obtained by averaging the top-down and bottom-up filtered measurement data ($\bar{X}_j$) point by point.

In order to fully understand the subsequent description of a program implementation of the invention, it is helpful to first understand the particular type of inverse filtering which will be employed. As noted earlier, the particular type of inverse filtering used with the present invention is not particularly critical as long as there is a calculation of the innovations in a measurement as part of the inverse filtering process. The inverse filtering discussed is that disclosed in the above-referenced application Ser. No. 557,093. To facilitate understanding of the present invention, a description of that inverse filtering technique is repeated hereinbelow in connection with FIG. 9, which is a flowchart of a computer implementation of the inverse filtering process.

The notation used in the subsequent description is as follows:

$$M_i = \begin{bmatrix} X_{i+L} \\ \vdots \\ X_i \\ \vdots \\ X_{i-L} \end{bmatrix} = \text{Vector of true information values that contribute to measurement } Y_i \quad (15)$$

$H_i$ = tool response function vector defined by Equation (3)

$$M_i(-) = \begin{bmatrix} X_{i+L}(-) \\ \vdots \\ X_i(-) \\ \vdots \\ X_{i-L}(-) \end{bmatrix} = \text{Estimate of } M_i \text{ before measurement } Y_i \text{ is processed} \quad (16)$$

$$M_i(+) = \begin{bmatrix} X_{i+L}(+) \\ \vdots \\ X_i(+) \\ \vdots \\ X_{i-L}(+) \end{bmatrix} = \text{Estimate of } M_i \text{ after measurement } Y_i \text{ is processed} \quad (17)$$

$V_k = E(N_k)^2 =$ noise power of measurement noise (18)

$Q_k = E[Y_k - N_k]^2 =$ signal power (19)

$$\phi = \begin{bmatrix} 0 \cdots\cdots 0 \\ I_{L-1} & \vdots \\ & 0 \\ 0 \end{bmatrix} = L \times L \text{ matrix with row one and column } L \text{ containing all zero elements. } I_{L-1} \text{ is an } (L-1)\times(L-1) \text{ identity matrix} \quad (20)$$

$$\begin{bmatrix} 1 \\ 0 \\ \vdots \\ 0 \end{bmatrix} = \text{column vector with } L \text{ rows containing a single non-zero entry in row one} \quad (21)$$

$$P_k(-) = E[M_k - M_k(-)][M_k - M_k(-)]^T \quad (22)$$
$= L \times L$ covariance matrix defined as indicated $$P_k(+) = E[M_k - M_k(+)][M_k - M_k(+)]^T \quad (23)$$
$= L \times L$ covariance matrix defined as indicated and $[0,0,\ldots 0,1] =$ row vector with $L$ columns containing a single non-zero entry in column $L$ (24)

The symbol E used in Equations (18), (19), (22) and (23) is the statistical expectation operator.

Using the above notation, the recursive innovations inverse filtering technique described in Ser. No. 557,093 is governed by Equations (25)–(30) below.

$$M_k(-) = \phi M_{k-1}(+) + \begin{bmatrix} 1 \\ 0 \\ \vdots \\ 0 \end{bmatrix} Y_{K+L} \quad (25)$$

$$P_k(-) = \phi P_{k-1}(+) \phi^T + Q_{k+L} \begin{bmatrix} 1 \ 0 \cdots 0 \\ 0 & \cdot \\ \vdots & \vdots \\ 0 \cdots 0 \end{bmatrix} \quad (26)$$

$$G_k = P_k(-)H_k[H_k^T P_k(-)H_k + V_k]^{-1} \quad (27)$$

$$M_k(+) = M_k(+) = G_k[Y_k - H_k^T M_k(-)] \quad (28)$$

$$P_k(+) = [I_L - G_k H_k^T]P_k(-) \quad (29)$$

$$\hat{X}_{k-L} = [0,\ldots,0,1]M_k(+) \quad (30)$$

The matrix appearing on the right-hand side of Equation (26) is an $L \times L$ matrix containing a single non-zero element of unit value in the first row and first column.

Actual inverse filtering of the log data requires that the processing technique be initialized. One choice for the initialization that has been found to work in practice is $$P_{1+L}(-) = I_L \begin{bmatrix} Q_{1+2L} \\ \vdots \\ Q_{1+L} \\ \vdots \\ Q_1 \end{bmatrix}$$

$$M_{1+L}(-) = \begin{bmatrix} Y_{1+2L} \\ \vdots \\ Y_{1+1} \\ \vdots \\ Y_1 \end{bmatrix} \quad (32)$$

Using the above initialization, the first measurement point processed is $Y_{1+L}$ and the final measurement point processed is $Y_{k-L}$, where k is the number of measurement points. The final estimated inverse point is seen to be $X_{k-2L}$.

Regardless of how the processing technique is initialized, the quantities $Q_k$ and $V_k$ are required for actual data processing. There are numerous approaches to obtaining first- and second-order averages from a single data record. J. S. Bendat and A. G. Peirsol, *RANDOM DATA: Analysis and Measurement Procedures,* Wiley-Interscience, N.Y. (1971) discusses how this can be done from single records of both stationary and non-stationary processes. However, this averaging is done, the second-order average of the data record denoted by $\sigma_k^2$ is equal to $$\sigma_k^2 = Q_k + V_k \qquad (33)$$

Unless there is evidence to the contrary, the measurement noise is assumed to be zero-mean with constant variance. Thus, the $V_k$ is, as a practical matter, taken to be a constant for all k. Since the quantity $\sigma_k^2$ in Equation (37) is known from the data, $Q_k$ can be determined in at least two ways. First, based on calculated tool measurement resolving accuracy, a numerical estimate of V can be obtained. Using this numerical value, Equation (33) is solved for $Q_k$. Second, the signal-to-noise ratio approach can be used where an estimate of the recorded data signal-to-noise ratio is made. This estimate denoted by R yields the equation:

$$R = Q_k / V \qquad (34)$$

which can be solved for $Q_k$.

Once $Q_k$ and V are obtained, Equations (31) and (32) are initialized and the data is recursively processed by the algorithm defined by Equations (25)-(30).

Figure 9:
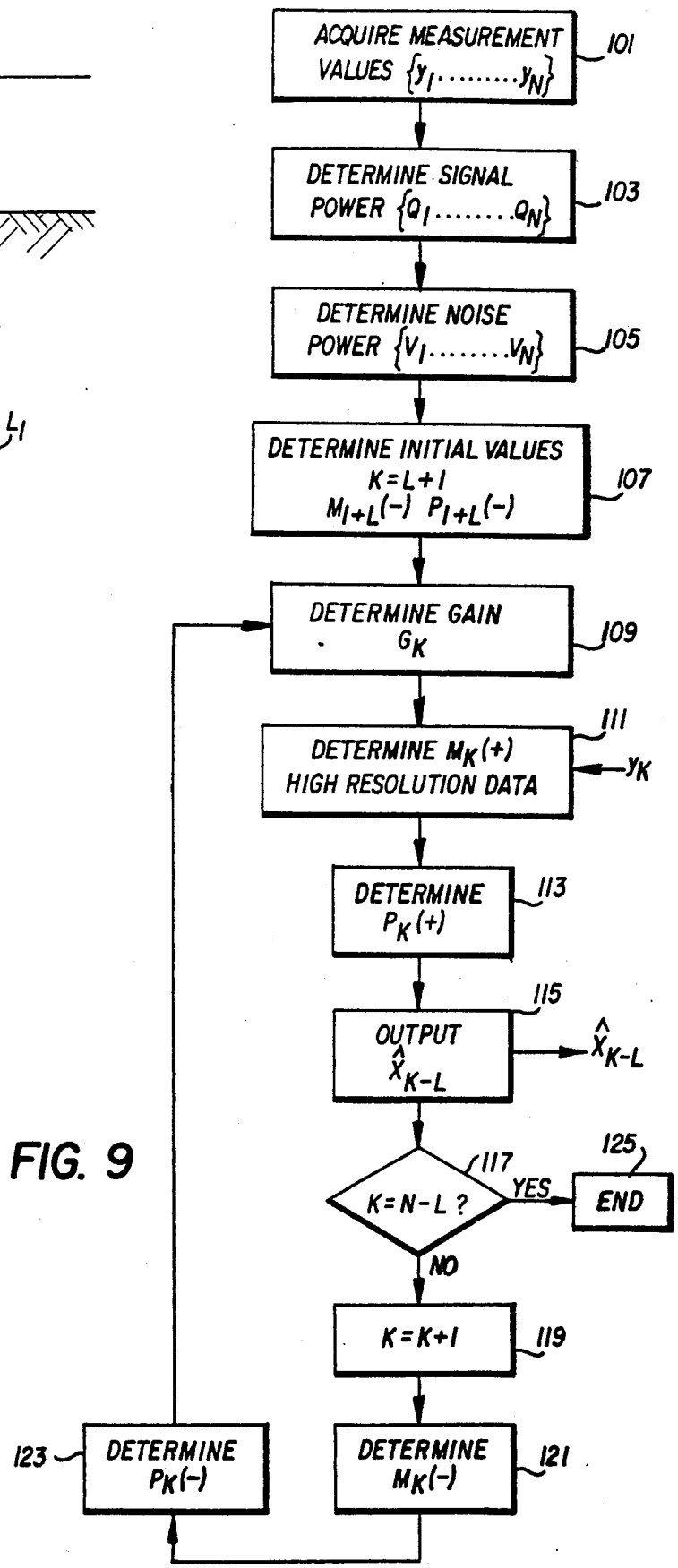
FIG. 9 is a flowchart of the overall inverse filtering program used in the present invention.

The entire methodical procedure of recursive innovations inverse filtering described above can be performed on one of a number of commercially available general purpose computers executing the program illustrated in flow chart format in FIG. 9.

In the first step 101, all measurement values $Y_1 \ldots Y_N$ taken from well logs are acquired and input, following which signal power $Q_1 \ldots Q_N$ and noise power $V_1 \ldots V_N$ values are determined in steps 103, 105, respectively. Initial processing values are then determined in step 107. The counter K is initialized as L+1, an estimated true measurement vector value $M_{1+L}(-)$ is determined in accordance with Equation (32), and an initial power vector value $P_{1+L}(-)$ is determined in accordance with Equation (31). The gain vector value $G_k$ is then determined in step 109 using Equation (27). In step 111, input value $Y_k$ is selected and the matrix of newly estimated measurement values $M_k(+)$ is calculated using Equation (28). Thereafter, in step 113, a newly estimated power vector value $P_k(+)$ is calculated using Equation (29). In subsequent step 115, a determined measurement value $\hat{X}_{k-L}$ is output in accordance with Equation (30). Thereafter, in step 117, a determination is made whether all measurements in the log have been processed (k=N−L). If not, the k value is incremented in step 119, the value $M_k(-)$ is redetermined according to Equation (25) in step 121 and the value $P_k(-)$ is redetermined according to Equation (26) in step 123. Thereafter, the procedure again executes step 109 and repeats until all log data is processed, as determined in step 117, after which the procedure terminates in step 125.

It should be appreciated that step 115 produces log values corresponding to measured log values which have been inverse filtered to minimize the averaging effects discussed above.

The foregoing discussion, beginning with Equation (15), is of the recursive innovations inverse filtering technique described in Ser. No. 557,093, wherein it was assumed that measurement noise is zero mean with constant variance. In order to detect, correct and remove impulse noise in the measured data in accordance with the inventive technique outlined above in Equations (10)-(14), the FIG. 9 inverse filtering program is used, with the modifications illustrated in FIGS. 10 through 13.

Figures 10, 11:
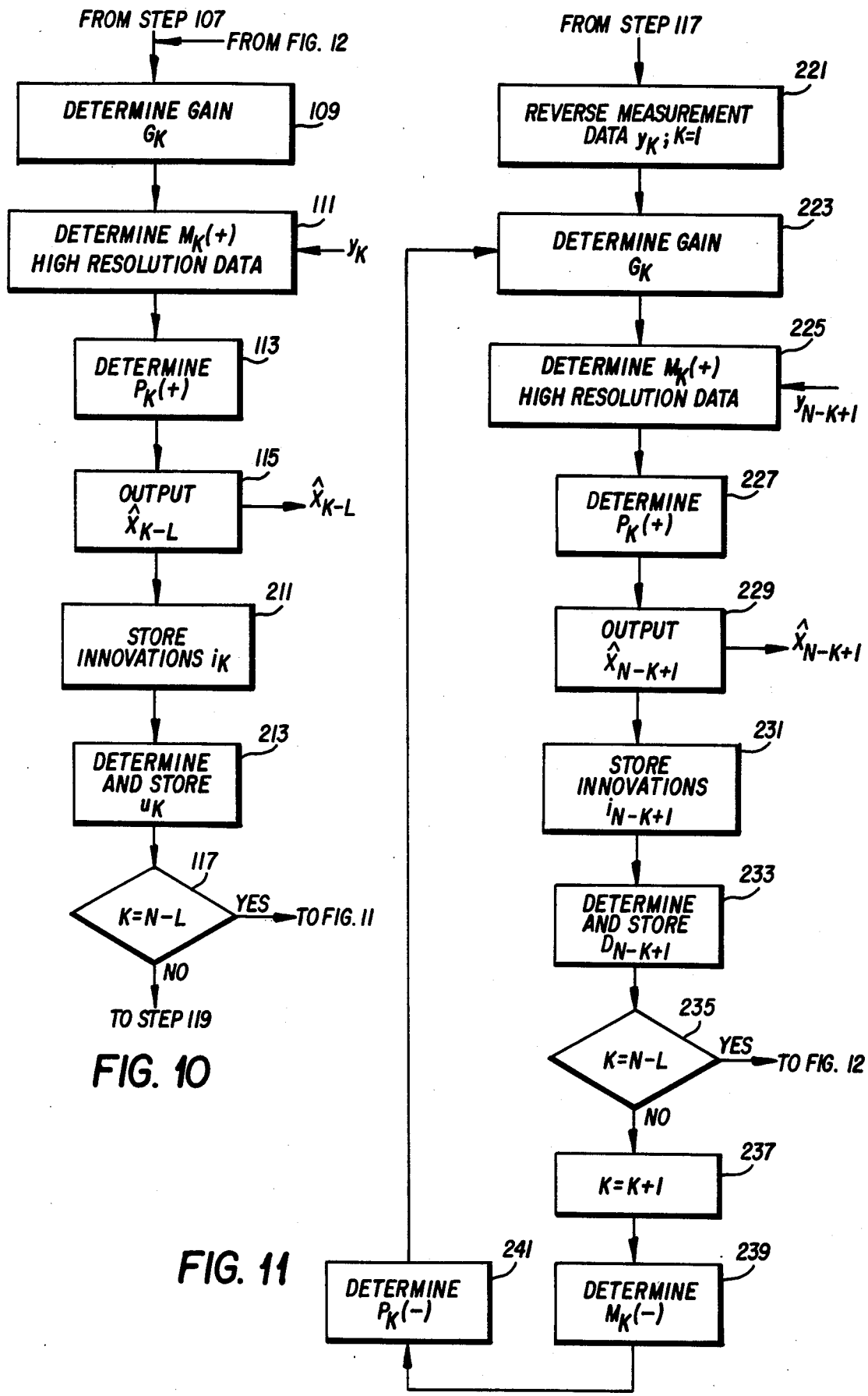
FIG. 10 is a flowchart of a modification of the FIG. 9 program implementing a portion of the method of the invention.
FIG. 11 is a flowchart of a program implementing another portion of the method of the invention.
Figure 12:
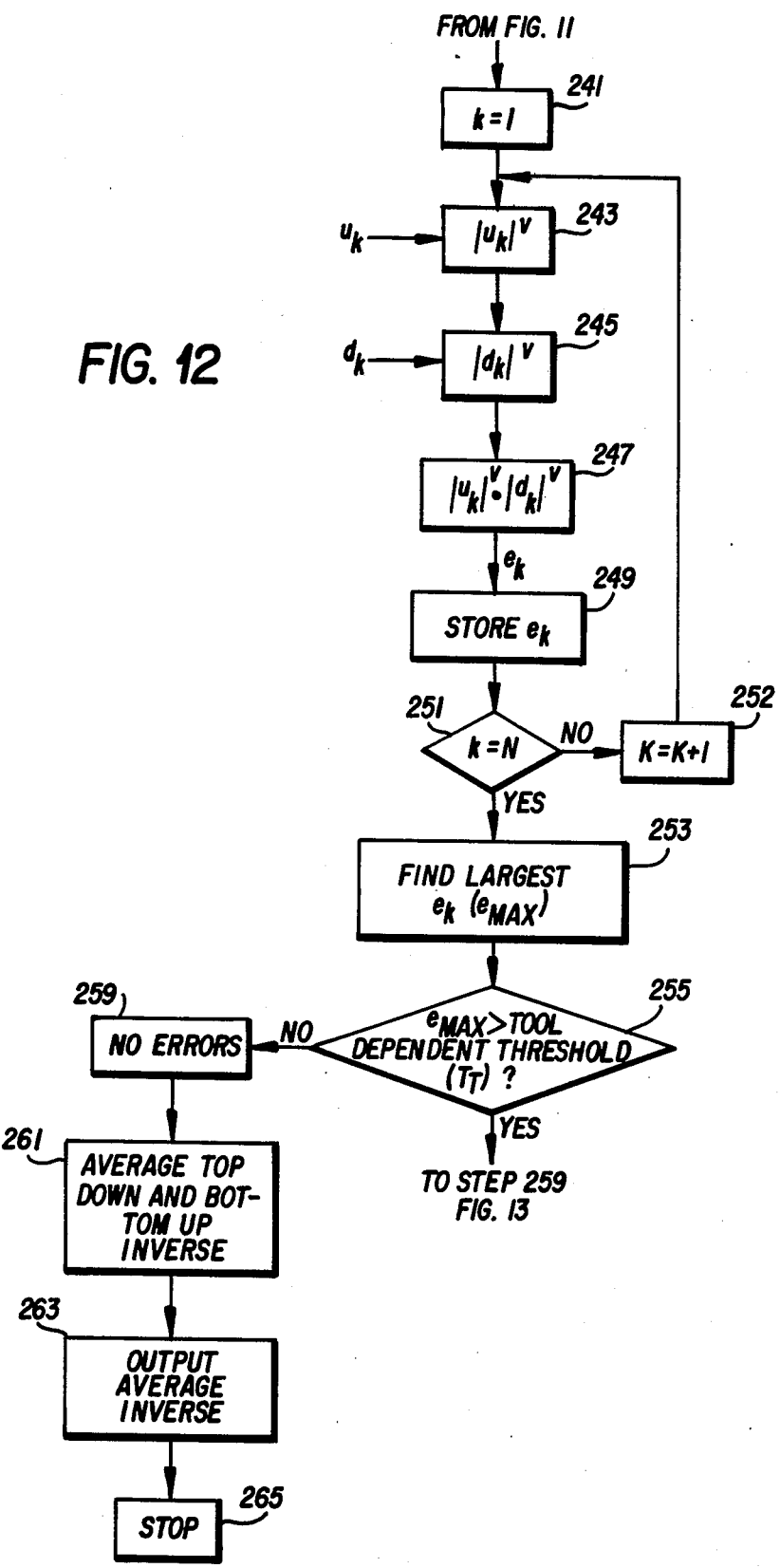
FIG. 12 is a flowchart of a program implementing yet another portion of the method of the invention.
Figure 13:
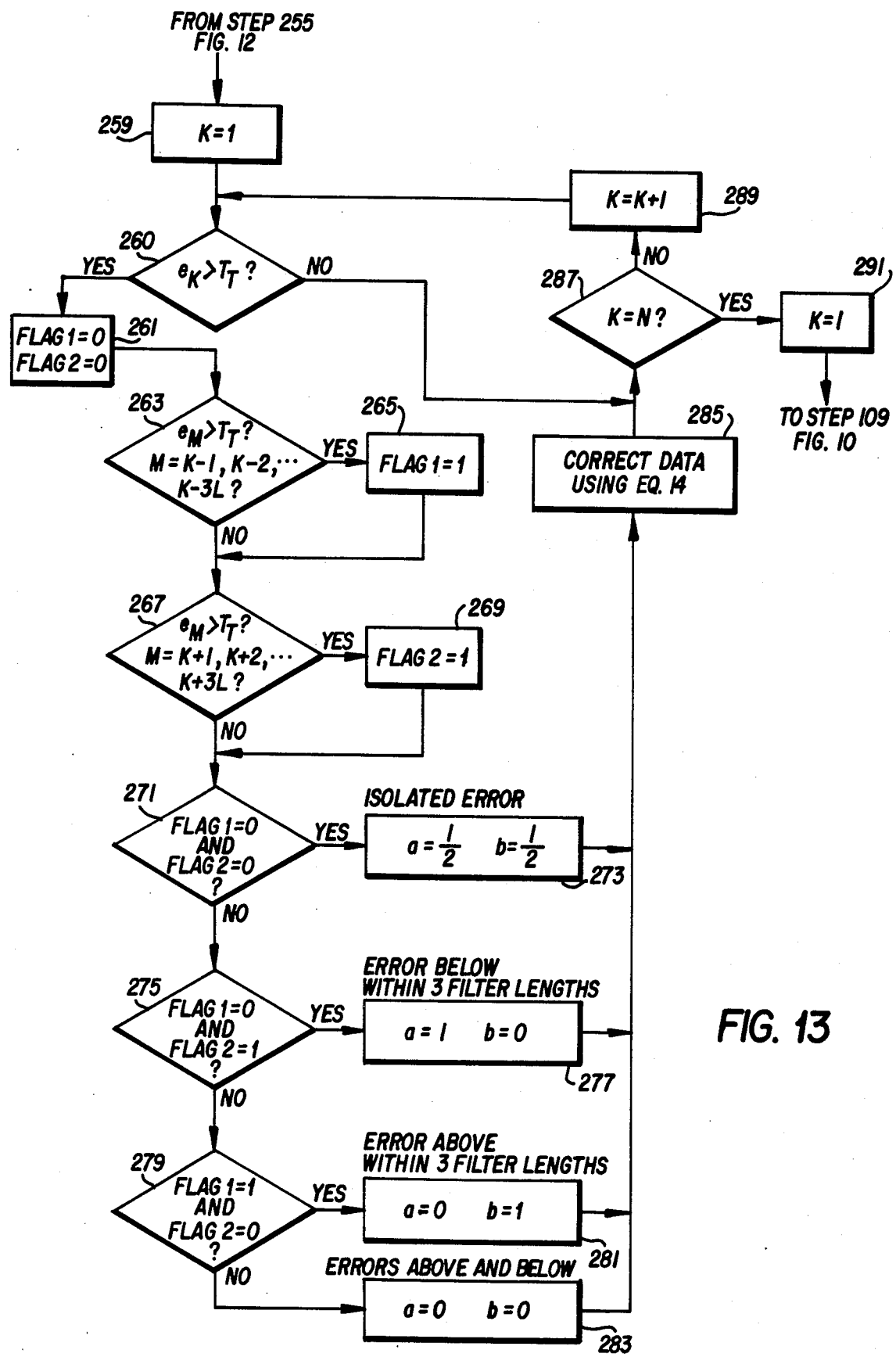
FIG. 13 is a flowchart of a program implementing yet another portion of the method of the invention.

FIG. 10 illustrates the modifications to the FIG. 9 program which, in addition to performing an inverse filtering operation, will also produce the $U_k$ values (using Equation (12)) used in the invention. FIG. 11 illustrates modifications to the FIG. 9 program which, in addition to performing an inverse filtering operation, will produce the $D_k$ values in the invention. FIG. 10 is a top-down filtering process wherein the measurement data estimates $\hat{X}_{k-L}$ are produced by processing from the uppermost to the bottommost measurement values $Y_k$, while FIG. 11 illustrates a bottom-up filtering process wherein the $Y_k$ measurement values are processed in a reverse (bottom-up) sequence. FIGS. 12 and 13 illustrate a program of the final processing sequence for correcting measurement values $Y_k$ to remove the effects of impulse noise.

FIG. 10 shows a portion of the FIG. 9 program from steps 109 to 123. In the present invention, two additional program steps 211, 213 are added between steps 115 and 117. In step 211, the innovations $i_k$, which are calculated during the inverse filtering process (Equation (28); step 111 of FIG. 10), are stored for subsequent use. The innovations $i_k$ are defined in Equation (10) above and appear in the processing of Equation (28), $M_k(+)$, discussed above. In step 213, the computer calculates the quantity $U_k$ using the innovations in accordance with Equation (11) above. The quantity $U_k$ is then stored by the computer, after which the computer proceeds to step 117 and proceeds from there, as described above with respect to FIG. 9.

When all measurement points are processed, as determined by step 117 in FIG. 10 (a yes response is noted), the computer has performed a top-down inverse filtering of the measurement data $Y_k$ and has produced a series of $U_k$ stored values for subsequent processing. It then proceeds to execute the FIG. 11 program, wherein a bottom-up inverse filtering operation is performed on the same initial measurement values $Y_k$ as used in the top-down processing. Since the data acquisition and initialization sequence for the inverse filtering operation has already been performed in steps 101 to 107 (FIG. 9), the only further pre-processing required is a reversal in orientation of the measurement points $Y_k$ (i.e., $Y_1 \ldots Y_N \rightarrow Y_N \ldots Y_1$), so that the same processing sequence used in FIG. 10 can be again used, but now to produce a bottom-up inverse filtering operation. This data reversal is performed in step 221, at which time a counter K is also set to a value of 1. Subsequent steps 223, 225, 227, 229, 235, 237, 239 and 241 correspond exactly to steps 109, 111, 113, 115, 117, 119, 121 and 123 of FIGS. 9 and 10; however, in step 225, the Y value input at this point (due to data reversal) is $Y_{N-K+1}$. In addition, steps 231 and 233 are added.

Proceding from step 221, in step 223, the gain vector value $G_k$ is determined (Equation (27)), following which in step 225, the next input value is selected. Because the measurement values $Y_k$ were reversed ordered in step 221, the input value is designated as $Y_{N-K+1}$. The matrix of newly estimated measurement values $M_k(+)$ is then calculated using Equation (28). Thereafter, in step 227, a newly estimated power value $P_k(+)$ is calculated using Equation (29). In subsequent step 229, a determined (estimated) measurement value $\hat{X}_{N-K+1}$ is output in accordance with Equation (30). Following this, in step 231, the computer stores innovations $i_{N-K+1}$ which were used in step 225 to determine the matrix $M_k(+)$ and, in step 233, the value $D_{N-K+1}$ is calculated $(D_{N-K+1}=i_{N-K+1}-H_{N-K+1}G_{N-K+1}i_{N-K+1})$. Following this step, the computer determines if all measurement values were processed in step 235 and, if not, increments the K counter in step 237, determines a new $M_k(-)$ according to Equation (25) in step 239, determines the power value $P_k(-)$ in step 241 and proceeds back to step 223, where the procedure from step 223 to step 241 repeats until all measurements have been processed, as determined in step 235.

The net result of the inverse filtering performed in steps 223–241 is to produce output estimates of measurement values $\hat{X}_j$, but in a bottom-up sequence, which accounts for the notation $X_{N-K+1}$ in step 229 wherein this estimate value is output. Once all $Y_{N-K+1}$ measurement values have been processed, as determined in step 241 of FIG. 12, the actual error detection and location aspect of the invention begins.

In step 241, a counter K is again set to 1, after which in step 243 the computer proceeds to read in a $U_k$ value and forms an absolute value thereof raised to the power v. From step 243, the computer proceeds to step 245 where it reads in a $D_k$ value and also takes the absolute value thereof and raises it to the same power v. Following this, the computer proceeds to step 247 where it multiplies the values obtained in steps 243 and 245 together and in accordance with Equation (13) above. Thereafter, the computer proceeds to step 249 where it stores the obtained $e_k$ value. The computer then proceeds to step 251 where it determines whether all values for $U_k$ and $D_k$ have been processed by testing it against a count value N (corresponding to the totality of the measurements in a log). If all $U_k$ and $D_k$ values have not been processed, the computer proceeds to step 252 where the K counter is incremented by 1, after which the computer proceeds back to step 243. Steps 243, 245, 247, 249, 251 and 252 are then repeatedly performed until the computer, in step 251, determines that all measurement $U_k$ and $D_k$ values have been processed. Following this, it proceeds to step 253 where it determines the largest $e_k$ value of all stored $e_k$ values ($e_{max}$). The computer then proceeds to step 255 where it determines whether $e_{max}$ is greater than a preset threshold value $T_t$, which represents a value associated with a particular tool used to make the measurements in the first instance. If in step 255 the $e_{max}$ value exceeds the tool threshold value $T_t$, the computer proceeds to step 257 where it begins the correction routine illustrated in FIG. 13.

The correction routine illustrated in FIG. 13 begins with step 259, wherein the computer sets a counter K value to 1. In subsequent step 260 the computer test an $e_k$ value to determine whether a particular $e_k$ value exceeds the tool dependent threshold value $T_t$. If the value $e_k$ does not exceed this threshold, the computer proceeds to execute step 287 where it determines if all $e_k$ values have been processed (k=n, the number of measurement points). If all $e_k$ values have not been processed, the K counter is incremented in step 289 and a new $e_k$ value is tested in step 260. Once an $e_k$ is found which exceeds $T_t$, the computer proceeds to step 261, where it sets a flag, flag 1, and a flag, flag 2, to a zero state. Thereafter in step 263, the computer proceeds to determine whether particular $e_k$ values above and below a then tested $e_k$ value also exceed the tool dependent threshold value $T_t$. To do this, $e_m$ values are tested in step 263 where m=K−1, K−2, ... K−3L, that is, all $e_m$ values are tested within a span of three filter lengths above the $e_k$ value tested in step 260. If one of these values exceeds the threshold $T_T$, then the computer sets flag 1 in step 265, otherwise the computer proceeds to step 267 where it determines whether the value $e_m$ for values of m below a particular $e_k$ value tested in step 260 exceeds the tool threshold value $T_t$. Here, m=K+1, K+2 ... K+3L so that all m values are tested within a span of three filter lengths below the $e_k$ value tested in step 260. If a yes response is noted in step 267, the computer proceeds to step 269 where it sets flag 2 equal to a 1 state. By means of steps 263 and 267, the computer has determined whether or not there are other impulsive errors within a spacing defined as 3 filter lengths either above or below a particular maximum error value $e_k$. and has represented its findings by the flags flag 1 and flag 2. Initially, both flags have a zero value, and if measurement errors are noted in 3 filter spacings above a particular maximum value $e_k$, flag 1 is set to a 1 state and likewise if there are errors within 3 filter lengths below a value $e_k$, flag 2 is set to a 1 state. In subsequent steps 271, 275 and 279, the computer determines the states of the flags, flag 1 and flag 2. If both are a zero value, indicating that the error $e_k$ then being processed is an isolated error, the constants $a=\frac{1}{2}$ and $b=\frac{1}{2}$ are selected in step 273 for use in correcting the measurement data by means of Equation (14). If flag 1 is zero and flag 2=1, as determined in step 275, meaning that there are errors below a particular $e_k$ value within 3 filter lengths, then the computer proceeds to step 277 where it selects the coefficients for Equation (14) as $a=1$ and $b=0$. If in step 279 the computer determines that flag 1 is set to a 1 value and flag 2 is set to a 0 value, this indicates that there are errors above and within 3 filter lengths of $e_k$, so the computer proceeds to step 281 where it sets the coefficient values as $a=0$ and $b=1$. If both flags are set to a 1 value, this too is determined at step 279 by a no response being detected by the computer, following which it proceeds to step 283 where it sets both the a and b coefficients to 0, since there are errors both above and below a processed $e_k$ value. Once the computer determines the status of the flags, flag 1 and flag 2, it then selects the appropriate coefficients in one of steps 273, 277, 281 or 283, the computer then proceeds to step 285 where it corrects the measurement data using Equation (14) and the coefficients a and b which have been selected. Thereafter, the computer proceeds to step 287, where it evaluates the value of K to determine if all measurements have been processed. If K does not equal the number of measurements N the computer proceeds to step 289 where it increments the K counter and then returns to step 260 where it begins processing the next $e_k$ value. Once the computer determines in step 287 that all K values have been processed, it sets a K counter equal to 1 again in step 291 and then proceeds to step 109 in FIG. 10 and begins the entire procedure from step 109 of FIG. 10 all over again until it determines in step 255 of FIG. 12 that the highest $e_{max}$ value is not larger than the tool dependent threshold value $T_t$. Once this occurs, the computer proceeds to step 259 where it determines that no errors exist in the processed measurements, following which the computer proceeds to step 261 where it averages the top-down and bottom-up inverse filtered measurement results, that is, it averages the estimated measurement values $\hat{X}_{K-L}$ obtained in step 115 of FIG. 10 with the estimated values $\hat{X}_{N-K+1}$ obtained in step 229 of FIG. 11. The computer then proceeds to step 263 where it outputs the averaged filtered measurement results and finally stops at step 265. At this point, the computer has stored measurement estimates $X_1 \ldots X_n$, which correspond to the original measured values $Y_1 \ldots Y_n$. These values have a higher resolution and improved data quality and have the effects of impulse noise removed therefrom.

Figure 3:
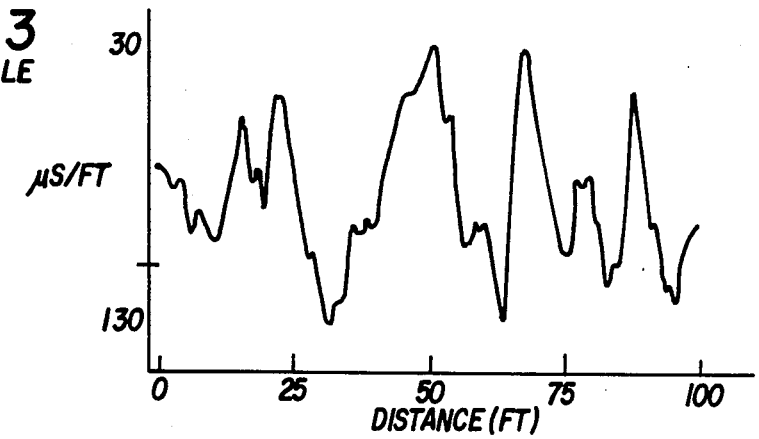
FIG. 3 is a graph of a synthetic sonic profile which is useful in explaining the invention.
Figure 4:
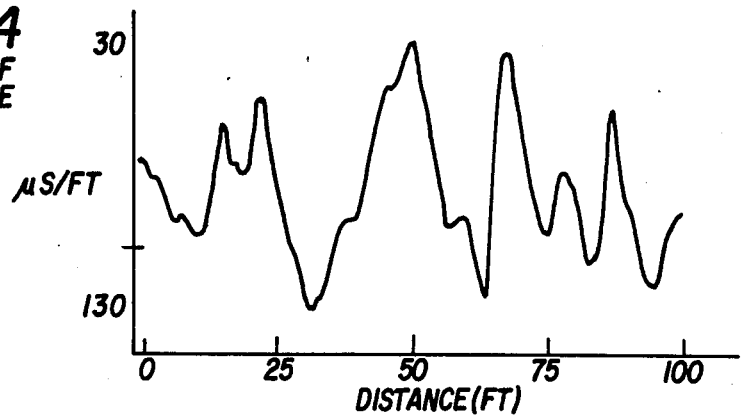
FIG. 4 is a graph of a sonic log of the FIG. 3 profile without impulse errors which is useful in explaining the invention.
Figure 5:
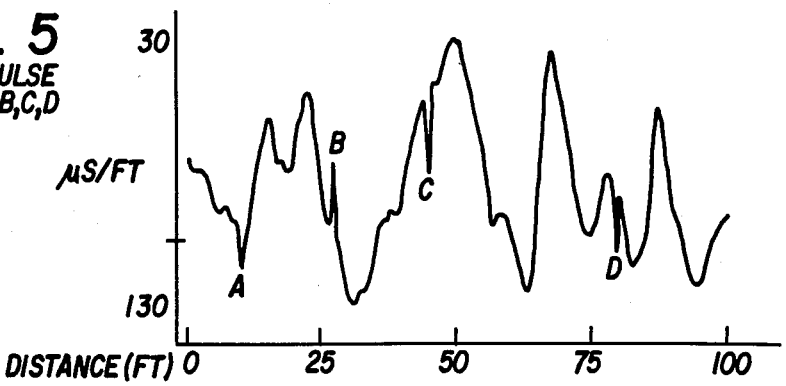
FIG. 5 is a graph of a sonic log of the FIG. 3 profile with impulse errors A, B, C, D which is useful in explaining the invention.
Figure 6:
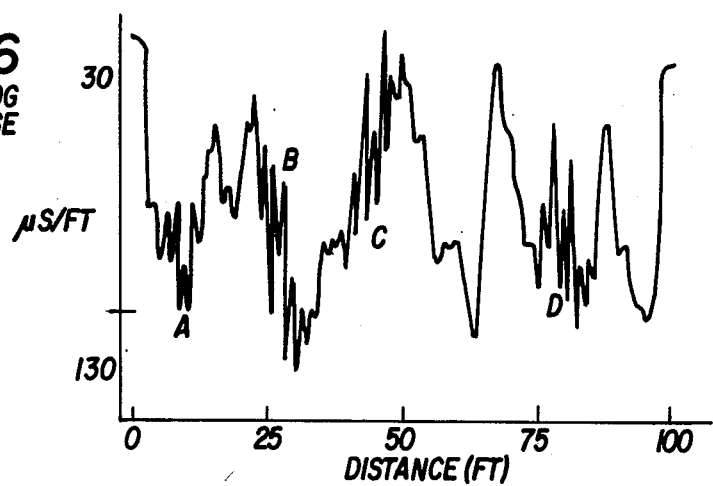
FIG. 6 is a graph of the sonic log of FIG. 5 after inverse filtering.

The improvement in data quality obtained with the invention is illustrated in FIGS. 3–8 below. FIG. 3 shows a synthetic sonic profile and FIG. 4 shows what a sonic logging tool having receiver spacing of, for example, two feet would record. In FIG. 5, impulse noise errors are created at points A, B, C and D as indicated in the FIG. 4 sonic log. FIG. 6 shows the results of inverse filtering the FIG. 5 log using the recursive innovations inverse filtering technique described with reference to the FIG. 9 program.

As shown in FIGS. 5 and 6, there are extreme oscillations in log values in the vicinity of the error points. It can be further seen that the magnitude of the oscillations are themselves no clue as to the location of the errors.

Figure 7:
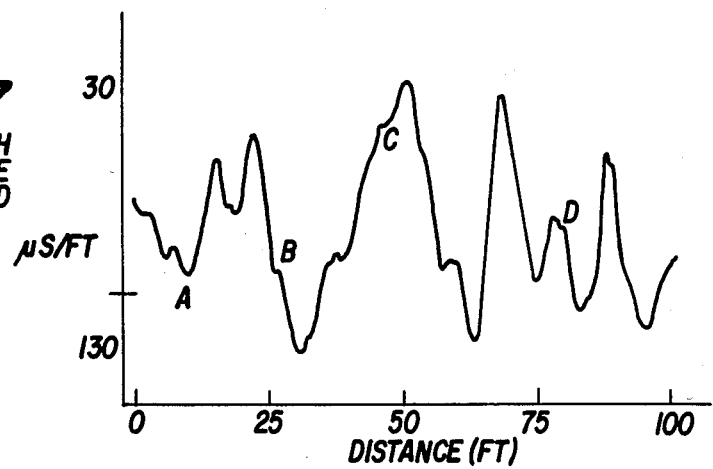
FIG. 7 is a graph of the sonic log of FIG. 5 after inverse filtering and with the effects of impulse noise removed therefrom.
Figure 8:
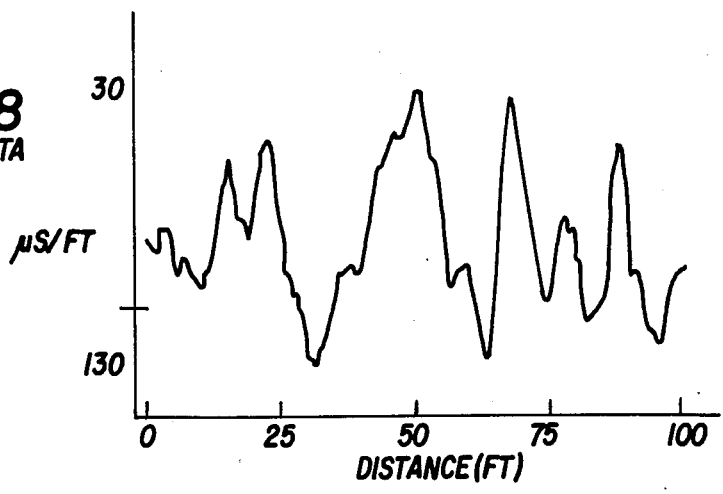
FIG. 8 is an inverse filtered and corrected FIG. 5 sonic log.

Application of the error detection, location and correction technique of the invention, as described with reference to FIGS. 10–13, results in the corrected sonic data profile of FIG. 7, in which it can be seen that the errors at points A, B, C and D have been corrected. The top-down and bottom-up averaged inverse of the corrected data is shown in FIG. 8. There it can be seen that the oscillations present in FIG. 6 have been eliminated, with the averaged inverse of the corrected data providing a measurement log with sharper resolution.

The illustration above was for sonic logs. However, the technique applies to any log obtained with a tool having a known response function H.

While a preferred embodiment of the invention has been described and illustrated, numerous modifications can be made without departing from its spirit and scope. Accordingly, the invention is not limited by the foregoing description, but is only limited by the scope of the appended claims.

We claim:

1. A method of increasing the vertical resolution of well log data, comprising the steps of:
    moving a well logging tool relative to a well bore and taking parameter measurements at a plurality of points along the well bore to produce a log of said parameter measurements, said parameter measurements being weighted average measurements of true parameter values;
    inverse filtering the data contained in said log to reduce the effects of weighted averaging on parameter measurements, said inverse filtering operation determining higher resolution estimates of said logged measurements from information contained in said measurements, and the response function of said logging tool;
    detecting, locating and reducing the effects of impulse noise contained in said log of parameter measurements when determining said higher resolution estimates; and,
    producing a log of said inverse filtered data which more accurately reflects said true parameter values.

2. A method as in claim 1, wherein said filtering operation detects and locates impulse noise in said parameter measurement using innovations which is new information contained in a parameter measurement which is not already contained in previous parameter measurements.

3. A method as in claim 2, wherein said impulse noise is detected and located by the steps of:
    (A) determining, for each parameter measurement point, changes $U_k$ in the innovations which occur as parameter measurements are processed in said inverse filtering operation in a top-down sequence to yield first higher resolution parameter measurements;
    (b) determining, for each parameter measurement point, changes $D_k$ in the innovations which occur as parameter measurements are processed in said inverse filtering operation in a bottom-up sequence to yield second higher resolution parameter measurements;
    (c) combining, for each parameter measurement point, said changes $U_k$ and $D_k$; and
    (d) determining whether the combination of $U_k$ and $D_k$ values exceed a predetermined tool threshold.

4. A method as in claim 3, wherein said steps (c) and (d) further comprise the steps of:
    (e) combining $U_k$ and $D_k$ at each parameter measurement point to yield error values $e_k$ as follows $$e_k = |U_k|^v \cdot |D_k|^v$$

where v is a positive number greater than one,
    (f) examining $e_k$ for its highest value; and
    (g) correcting the parameter measurements at least at points in said log corresponding to points where $e_k$ has its highest value.

5. A method as in claim 4, wherein said parameter measurements are corrected in accordance with the following relationship:

$$Y_k' = Y_k + a[U_k - Y_k] + b[D_k - Y_k]$$

where $Y_k$ are the log parameter measurements at a point k, $Y_k'$ are the corrected parameter measurements at a point k and a and b are each either zero or a positive constant.

6. A method as in claim 5, wherein steps (a) through (g) are recursively performed until changes in parameter measurement $Y_k$ at identified error points are less than a predetermined value.

7. A method as in claim 6, wherein said predetermined value corresponds to the measuring accuracy of said logging tool.

8. A method as in claim 6, wherein after said steps (a) through (g) are recursively performed, final inverse log data is obtained by averaging said first and second higher resolution parameter measurements for each measurement point.

9. A method as in claim 5, wherein the constants a and b are respectively positive numbers if a detected impulsive error has no impulsive errors above or below it within a predetermined number of measurements, the constants a and b are respectively 0 and a positive number if there is another impulsive error above a detected error within a predetermined number of measurements, the constants a and b are respectively a positive number and 0 if there is an error below a detected impulsive error and within a predetermined number of measurements, and the constants a and b are both 0 if there are errors above and below a detected error and within a predetermined number of measurements.

10. A method for reducing impulse noise contained in well log data, comprising the steps of:

moving a well logging tool relative to a well bore and taking parameter measurements at a plurality of points along the well bore to produce a data log of said parameter measurements;

processing the data contained in said log to determine innovations in said data which is new information in each parameter measurement which is not already contained in previous parameter measurements;

using said innovations to detect the presence and location of impulse noise in said log of parameter measurements; and correcting said log of parameter measurements at the locations determined using said innovations by reducing the effects of said impulse noise thereat.

11. A method as in claim 10, wherein the presence and location of said impulse noise is detected by the steps of:

determining changes in said innovations which occur as measurement data points in said log are processed in a first direction;

determining changes in said innovations which occur as measurement data points in said log are processed in a second direction;

combining, for each measurement point, the innovation changes which occur in said first direction with those which occur at the same measurement point in said second direction; and determining when said combination of innovation changes exceeds a predetermined criteria.

12. A method as in claim 10, wherein said log of parameter measurements is corrected using, for each measurement point, a combination of the actual parameter measurement thereat, the change in innovations thereat caused by processing said log in said first direction and the change in innovations thereat caused by processing said log in said second direction.

13. A method as in claim 10, wherein said innovations are determined during an inverse filtering of said log of parameter measurements, said inverse filtering improving the resolution of said log of parameter measurements and reducing an inherent weighted averaging effect incident to the acquisition of said parameter measurements.

14. A method as in claim 13, wherein said impulse noise is detected and located by the steps of:

(a) determining, for each parameter measurement point, changes $U_k$ in the innovations which occur as parameter measurements are processed in a top-down sequence;

(b) determining, for each parameter measurement point, changes $D_k$ in the innovations which occur as parameter measurements are processed in a bottom-up sequence;

(c) combining, for each parameter measurement point, said changes $U_k$ and $D_k$; and (d) determining whether the combination of $U_k$ and $D_k$ values exceed a predetermined criteria.

15. A method as in claim 14, wherein said steps (c) and (d) further comprise the steps of:

combining $U_k$ and $D_k$ as follows:

$$e_k = |U_k|^v \cdot |D_k|^v$$

where v is a positive number greater than one, (f) examining $e_k$ for its highest value; and (g) correcting the parameter measurements at least at points in said log corresponding to points where $e_k$ has its highest value.

16. A method as in claim 15, wherein said parameter measurements are corrected in accordance with the following relationship:

$$Y_k' = Y_k + a[U_k - Y_k] + b[D_k - Y_k]$$

where $Y_k$ are the log parameter measurements at a point k, $Y_k'$ are the corrected parameter measurements at a point k and a and b are each either zero or a positive constant.

17. A method as in claim 16, wherein the constants a and b are respectively positive numbers if a detected impulsive error has no impulsive errors above or below it within a predetermined number of measurements, the constants a and b are respectively 0 and a positive number if there is another impulsive error above a detected error within a predetermined number of measurements, the constants a and b are respectively a positive number and 0 if there is an error below a detected impulsive error and within a predetermined number of measurements, and the constants a and b are both 0 if there are errors above and below a detected error and within a predetermined number of measurements.

* * * * *